Sept. 15, 1964    J. J. LINDQUIST ETAL    3,148,527
DYNAMIC ERROR CALIBRATOR

Filed May 12, 1960    3 Sheets-Sheet 1

INVENTORS
JAMES J. LINDQUIST
VERNE R. BAUMAN
BY ARVE R. SJOVOLD

ATTORNEY

Sept. 15, 1964     J. J. LINDQUIST ETAL     3,148,527
DYNAMIC ERROR CALIBRATOR
Filed May 12, 1960     3 Sheets-Sheet 3

INVENTORS
JAMES J. LINDQUIST
VERNE R. BAUMAN
ARVE R. SJOVOLD
BY
ATTORNEY

United States Patent Office 3,148,527
Patented Sept. 15, 1964

3,148,527
DYNAMIC ERROR CALIBRATOR
James J. Lindquist, Northridge, Arve R. Sjovold, Simi, and Verne R. Bauman, Canoga Park, Calif., assignors to North American Aviation, Inc.
Filed May 12, 1960, Ser. No. 28,664
12 Claims. (Cl. 73—3)

This invention relates to the measurement of bias errors inherent in fluid flow measurement systems wherein such errors arise from the dynamics of fluid operation. It more particularly relates to the calibration of means for measuring and controlling such errors in flowmeter calibrators.

The accurate calibration of flowmeters is of great importance in many areas of our technology. For example, in a missile, the rate of flow of tremendous quantities of liquid fuel and oxidizer must be accurately measured during the critical period of propellant ignition and early missile flight. Accuracy in this regard can be accomplished only by first assuring that the means for accomplishing the calibration is accurate. It is the initial calibration of the flowmeter calibrating system itself as opposed to the direct and immediate calibration of flowmeters per se, with which the present invention is primarily concerned.

Fuid flow is by its nature dynamic. However, because the basic standards used in calibration procedures are by nature static, flowmeter calibrators are certified statically. In a co-pending application of the instant inventors entitled "Volumetric Flow Meter Calibrator," filed November 5, 1959, Serial No. 851,053, it is set forth that the overall accuracy of a particular system as a calibrator for a flow measuring device was determined by three factors: (1) the basic precision of the system; (2) any inherent bias error caused by virtue of its operation; and (3) its calibration against the standard.

The first factor represents the ability of the flowmeter calibrator to accurately repeat its measurements. The third factor pertains to the excellence of the basic standards and, hence, has no relation to the operation of the flowmeter calibrator. However, during operation of the flowmeter calibrator, and by virtue of the dynamics of such operation, i.e., inertial forces, viscous friction, etc., bias errors which were absent during static certification often occur. These errors, though small in magnitude, are nevertheless real and may widen error limits unduly when present in combination. These errors are the subject of the second factor, the correction of which provides the field to which the present invention is directed. The existence of such bias errors is acknowledged in common practice. If it were possible to construct a perfectly linear transducer and to operate on it in conjunction with a laboratory standard with some stepwise increasing dynamic level, departure of the standard from perfect linearity by comparison with the transducer could be determined. Thus, if the test started from zero dynamic level (static conditions) the error resulting from increasing the dynamic operating level of the standard could be easily determined, and the function would represent absolute error. Unfortunately, such a transducer does not exist. Hence, bias errors are generally accounted for by component error analysis. For example, in a conventional catch-and-weigh flowmeter calibrator, errors may arise from transient response of the weigh scale and in friction of the fulcrum. The magnitude of each error is estimated conservatively and these errors are defined to derive the net maximum error. This approach is generally not fully reliable resultant from the necessity of applying many simplifying assumptions, e.g., those in computing transient response errors. The error so determined may be greater or less than the theoretically derived estimate and may vary in magnitude from one flow rate to another.

It is, therefore, an object of invention to provide a means and a method for calibrating dynamic errors in fluid flow calibration systems.

Another object is to provide means for determining the kinetic effects of moving fluids on a fluid flow calibration system.

Yet another object is to provide a method for evaluating dynamic error without resort to theoretical analysis.

A further object is to provide means for substantially eliminating bias errors in a system for calibrating flowmeters.

A still further object is to provide means for the dynamic calibration of test equipment utilized in the measurement of flow rates and temperatures.

These and other objects will be better understood by reference to the accompanying drawings in which.

The invention comprises a method and means for calibrating a dynamic calibrator against itself, thereby providing an accurate indication of the net bias error at different flow rates. The system for accomplishing this function broadly comprises a plurality of fluid flow lines, means in each line for controlling and detecting fluid flow rate, means common to all lines to detect the sum of all line flows, means for indicating flow through the individual lines and the sum thereof whereby the flows may be compared to provide an accurate reading of dynamic error in the system. Means for automatically computing the error and utilizing same in system corrections are also provided.

Figure 1:
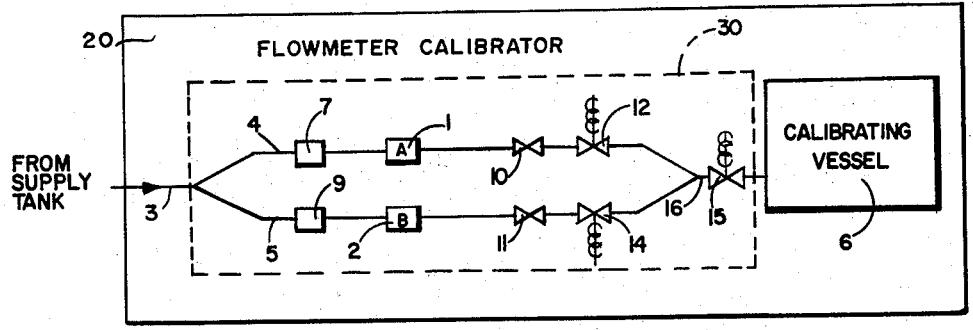
FIG. 1 is a schematic view of a dynamic calibrator.

The more specific aspects of the invention will be better understood by reference to the drawings. In the schematic representation of FIG. 1, a dynamic calibrator portion 20 of the invention is generally referred to in its most commonly used form as a flowmeter calibrator. This flowmeter calibrator includes a dynamic error analysis or test section 30 encompassing that portion within the dotted lines, in series with a calibrating vessel 6. Test section 30 includes a pair of fluid flow lines 4 and 5 (shown representatively only, any number being usable) connected in parallel and leading from a common line 3 originating at a fluid supply source (not shown). As illustrated, branch lines 4 and 5 include, respectively, flowmeters A and B, numbered as 1 and 2, flow straighteners 7 and 9 disposed upstream of the flowmeters, flow control valves 10 and 11 mounted downstream of the flowmeters to provide means for preselecting nominal flow rates, and on-off valves 12 and 14 downstream of valves 10 and 11. Lines 4 and 5 converge downstream of valves 12 and 14 and a system on-off valve 15 is disposed in the resulting common line 16 which leads directly into calibrating vessel 6. These components (i.e., flowmeters, valves, etc.) may be of any conventional construction. It is, of course, in keeping with the intent of the invention that components of the greatest accuracy available be utilized.

Figure 9:
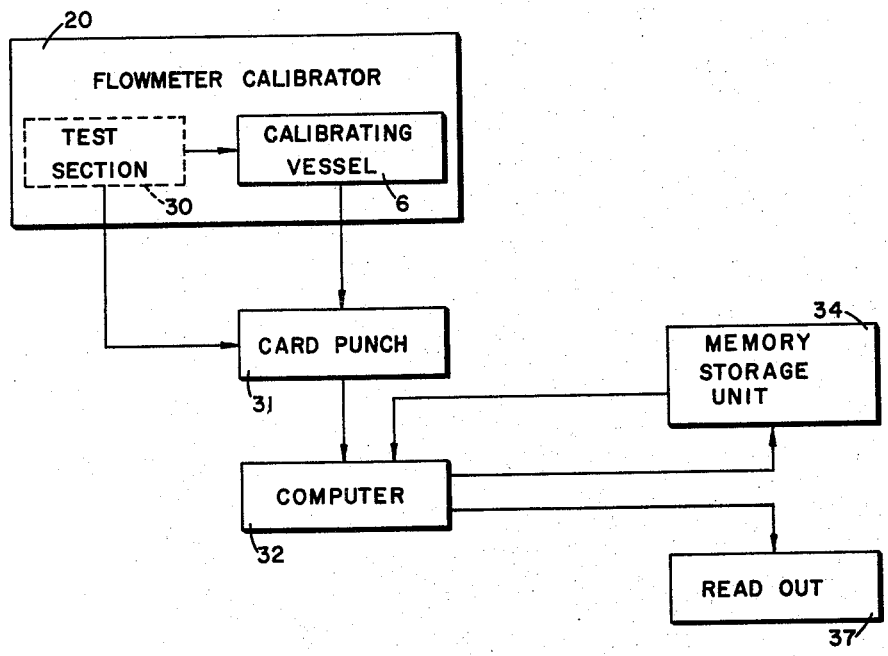
FIG. 9 is a schematic block diagram showing the complete system of the invention as arranged for practical operation.

The flowmeter calibrator is equipped with appropriate recording instrumentation and data processing equipment, as further set forth with respect to FIG. 9. However, respecting the portion of the invention representatively illustrated in FIG. 1, an operational sequence includes the steps of:

(1) Imposing a pre-selected nominal flow rate on each parallel branch of test section 30 in turn. For example, assuming that on-off valve 12 of branch line 4 and valve 15 in an open position and on-off valve 14 of line 5 is closed, a flow rate of 6 gallons per minute (g.p.m.) is passed through line 4 and the components disposed therein, the rate being established by adjusting control valve 10. Flowmeter 1 is thereby calibrated against conventional calibrating vessel 6. Valve 12 is then closed and valve 14 is opened. Valve 11 is adjusted to pass 6 g.p.m. and flowmeter 2 is then similarly calibrated against vessel 6. In this manner, a calibration factor at 6 g.p.m. for each flowmeter is obtained, assuming the statically measured volume of the calibrating vessel.

(2) Imposing the combined branch line flows on the calibrating vessel. This is accomplished by opening valves 12 and 14 such that the flow rate in each is equal to that of step 1. Fluid flows through branch lines 4 and 5 provide a total flow rate of 12 gallons per minute into calibrating vessel 6.

The flow rate in each branch is still 6 g.p.m. and the calibrating factor of 6 g.p.m. determined for each flowmeter is still valid. Using the output of each flowmeter during step 2, together with the 6 g.p.m. calibration factor, the total volume of liquid passed through each branch is computed. Calibrating vessel 6 actually measures a fluid volume at $n \cdot q_1$ where $n$ is the number of branch lines and $q_1$ is the step 1 flow rate. Since the calibration factors can be used to compute that portion of the 6 g.p.m. volume which passed through each respective flowmeter, the sum of these individual volumes should equal the statically measured volume for calibrating vessel 6. However, vessel 6 has experienced an increase in flowrate and the actual volume measured may not agree with the sum of the volumes of flowmeters 1 and 2. Any discrepancy between the assumed volume and that from the sum branch flows represents the dynamic error in intersected volume for 12 g.p.m. relative to 6 g.p.m.

It will be noted that the flowmeters have entered only as momentary transfer standards in system operation, such that the originally assumed volume has been tested against itself. Therefore, the validity of the measured discrepancy is not effected. However, the operation of steps 1 and 2 cannot test the absoluteness of the error, since any discrepancy measured is purely relative between two flow rate situations.

(3) The operation of step 1 is then repeated using a flow rate in each branch equal to $n \cdot q_1$, thereby obtaining a new calibration factor for each flowmeter, the flow rate measured in step 2, i.e., 12 g.p.m.

(4) A flow of $n \cdot q_1$ is next imposed on each branch line such that the total flow of the combined branches into the calibrator then equal $n \cdot n \cdot q_1$ (24 g.p.m. here). Similar to step 2, the output of each flowmeter, in conjunction with the calibration factors determined in step 3, yields the component flows corresponding to each branch. The sum of these flows, as before, should equal the volume used in step 3. The supporting logic is the same as for step 2, i.e., 12 g.p.m. is passed through each branch simultaneously to produce 24 g.p.m. entering vessel 6, any discrepancy between the assumed and the sum values of the branches represent the dynamic error in the intersected volume for 24 g.p.m. relative to 12 g.p.m.

(5) Successive steps following this sequence are preferably continued until the practical range of the flowmeter calibrator is exhausted, the incremental steps being either increasing or decreasing in volume.

(6) The trials of flowmeter calibrator 20 thus far described have utilized equal branch flow rates. Under certain conditions, as later explained, it is sometimes desirable to obtain additional readings. Therefore, after the calibrator range has been covered in this manner, combinations of unequal flow rates may be utilized. During these trials the calibration factors determined for the heretofore described flow rates for the respective branches are used for comparison purposes.

Figure 2A:
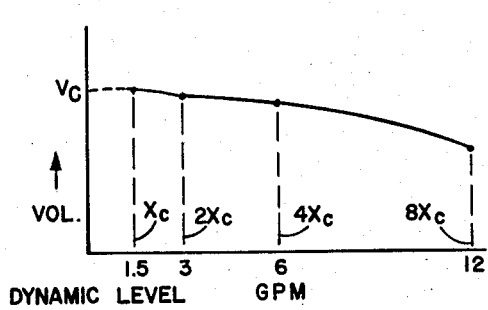
FIG. 2a is a graph plotting calibrating vessel volume versus fluid flow rate.

Since in each trial only the relative error is measured and since the volumes assumed for single branch flows depend on the former trials, these errors are summed algebraically to yield an error curve in the measured volume versus flow rate graph of FIG. 2a. This curve shows the net departure in volume measured by calibrating vessel 6 ($V_c$) for 4 separate trials, the flow rate being increased in equal calibration factor increments ($X_c$) in the manner described in steps 1–5.

It will be noted that the net departure tends to zero as flow rate is decreased. It can therefore be deduced that as flow rate approaches zero, the statically measured value applies. Thus, the curve represents departure from the static value versus flow rate and is representative of an absolute error curve.

Figure 2B:
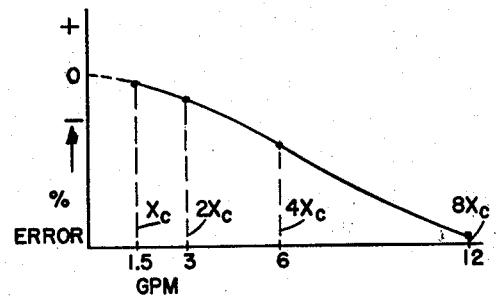
FIG. 2b is a graph plotting percentage error versus flow rate.

The curve of FIG. 2b similarly plots percentage of error versus flow rate. In generating such curves as FIGS. 2(a) and 2(b), it must be remembered that the jump from single to combined flow yields the relative error caused by that particular step. Now the volume used for the next higher set is the corrected first volume. Thus, the errors are cumulative. That is, the actual dynamic volume measured by the calibrator vessel at 12 g.p.m. is the volume at 1.5 plus the error of 1.5 relative to 3 plus the error of 3 to 6 plus the error of 6 to 12. Hence, the term "relative error."

The sensitivity of this type of evaluation is determined by the precision of the flowmeters and the number of sample point taken in each step. Any discrepancies encountered during the various steps are tested to determine their significance on a statistical basis and, in each case, if the discrepancy is not significant, the initially assumed value for that step is used.

Figure 3:
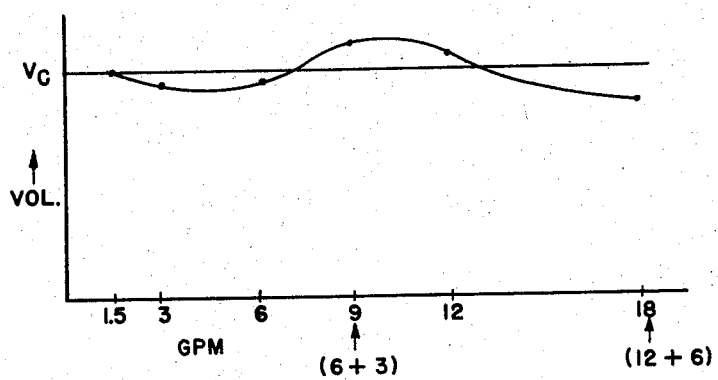
FIG. 3 is a graph showing the relation between the predetermined flow rate into the calibrating vessel and the quantity of liquid collected in the calibrating vessel, using asymmetric flow levels.

To illustrate the importance of testing errors, one need only imagine how large the cumulative error could be if insignificant errors were considered over, say, ten steps. In addition, the error curve may not be the simple function shown in FIG. 2(a) and 2(b). Consequently the experimental points must be tested, to determine whether the excursions are random scatter or actual biases. Whenever the error function appears to have other than a simple form, more points may be necessary than can be generated with symmetrical combinations. Once through the range with symmetrical combinations, the asymmetric sets of step 6 can be taken, as shown graphically in FIG. 3. We know what the value of $V_c$ is at 3 and 6 g.p.m. so $3+6=9$ can be another point. $6+12=18$ can be another, and so forth. Thus, points are taken astride those which indicate significant errors to lend confidence to the form of the curve and to better establish where the error becomes essentially insignificant.

The determinations as to the significance of errors are preferably carried out by a computer, which may be any one of a number of well-known computers, such as the IBM–704. The computer includes means and is programmed to manipulate all data, test for significant discrepancies, and store correction factors embodying the results of the dynamic error trials. When new calibration data is entered into the computer, it makes the necessary corrections as the data is manipulated. Thus, the results of a calibration procedure are corrected for dynamic error in the calibrator and presented in corrected form.

FIG. 9 presents, in block diagram form, flowmeter calibrator 20 integrated into a system including computer means and automatic readout means for making appropriate computations and presented corrected data. Flowmeter calibrator 20, including testing section 30 and calibrating vessel 6, is interconnected with a card punch 31 of conventional configuration. As each of the trials described above progresses, flowmeters 1 and 2 in the branch lines of test section 30 deliver signals representing flow volume therethrough to the card punch unit. At the same time, fluid flow into calibrating vessel 6 is recorded by the same card punch. The data so recorded from both sources is transferred to the electronic data processing machine or computer 32. It is this computer 32 which may be one of the well-known types such as IBM-704, programmed to carry out the required statistical analysis. Computer 32 performs a complete statistical analysis and evaluation of the data and computes the error factors function on the basis of comparison of values from the flowmeters of test section 30 and those obtained from calibrating vessel 6.

The error factor is, at the discretion of the operator, either recorded by read out device 33 or directed to storage unit 34, both of which are in actuality portions of computer 32, for subsequent use in calibration procedures.

At this juncture the calibration system or flow bench is in a condition to perform calibrating functions with respect to particular test flowmeters. In accomplishing this, the flowmeter to be tested is installed in one of the branch lines of test section 30, e.g., in the initial position of flowmeter 1. The entire system is then operated under the established conditions, the output of the flowmeters being entered on punch cards by card punch 31. These cards are then processed through computer 32. During the resulting computations, dynamic errors of the calibrator previously recorded and stored in storage unit 34 are fed back into computer 32 and utilized in the computations, thereby correcting for the results previously obtained respecting the dynamic error calibrator. The calibrations of the test flowmeter are then printed out in corrected form by readout device 33.

It will thus be seen that a system has been provided for determining the characteristics of a flowmeter calibrator with great accuracy. This calibration system may be used at any time subsequent to the described initial calibration procedure, to determine calibration constants of flowmeters or similar devices.

Figure 4:
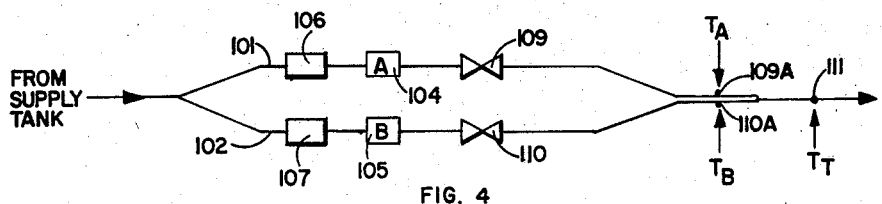
FIG. 4 is a schematic view of an alternative embodiment of the invention arranged for dynamic calibration of the system for temperature measurements.

When the system is applied to temperature measurements, an arrangement such as that shown in FIG. 4 may be utilized as the dynamic calibrator. Two flow line branches, 101 and 102, are representatively illustrated therein. Flowmeters 104 and 105 and flow straighteners 106 and 107 are respectively provided in the lines as are valves 109 and 110 for adjusting flow rates. Temperature transducers $T_a$ and $T_b$ are disposed in lines 101 and 102, respectively, at the positions indicated as 109A and 110A. A similar temperature transducer $T_t$ is installed at position 111 in a common line into which lines 101 and 102 have merged. This arrangement of components facilitates the determination of dynamic temperature measurement errors as functions of the stream velocities resultant from substituting the outputs of transducers $T_a$ and $T_b$ for the outputs of flowmeters 1 and 2 in the FIG. 1 configuration. The output of transducer $T_t$ is substituted for the output of calibrating vessel 6 in that configuration.

Figure 5:
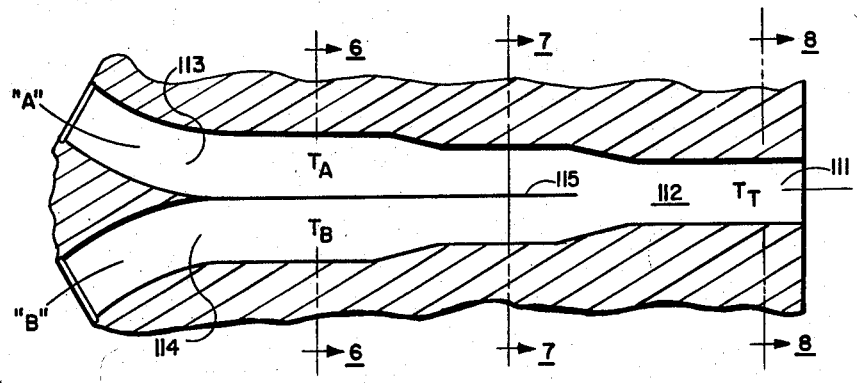
FIG. 5 is a longitudinal sectional schematic view of that portion of the embodiment of FIG. 4 in which the material flowing through the two separate branches is combined into a single conduit.
Figure 6:
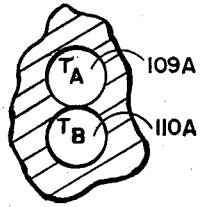
FIG. 6 is a transverse section of the conduit arrangement of FIG. 5 taken along line 6—6 of FIG. 5.
Figure 7:
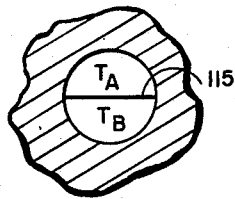
FIG. 7 is a transverse section taken along line 7—7 of FIG. 5.
Figure 8:
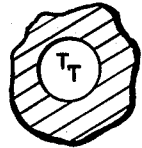
FIG. 8 is a transverse section taken along line 8—8 of FIG. 5.

FIG. 5 illustrates a typical cross-section of flow conduits 109A and 110A, generally corresponding to the convergent portion of conduits 101 and 102 of FIG. 4. The convergent portions ultimately join in a common section at 112. FIGS. 6, 7 and 8 show the shapes of typical conduit sections as they converge, the sections being taken along lines 6—6, 7—7, and 8—8 of FIG. 5. In FIG. 7, the channels $T_a$ and $T_b$ are separated by a septum 115 which terminates short of the region indicated as 112.

Since the cross-sectional area illustrated in FIG. 8 is the same as the individual areas of channels 113 and 114 of FIG. 5, the dynamic error analysis will show the effect, if any, of stream velocity on the temperature measurements performed by the temperature transducers.

Although the invention has been described and illustrated in detail, it is to be clearly understood that the same is by way of illustration and example only and is not to be taken by way of limitation, the spirit and scope of this invention being limited only by the terms of the granted claims.

We claim:

1. In a flow bench adapted to calibrate flowmeters and the like, means for calibrating particular flowmeters to provide readings free from dynamic error, comprising: a plurality of conduits through which flow may be established, a first one of said conduits being adapted to receive a flowmeter to be calibrated; means for providing a pre-selected series of nominal flow rates through said bench at a number of differing dynamic levels; means responsive to said nominal flow rates for registering said series of nominal flow rates at differing dynamic levels; means for determining and registering the actual flow rates corresponding to each of said series of nominal flow rates; means for determining the differences between said actual and nominal flow rates at said differing dynamic levels; means to determine the errors due to dynamic flow at differing levels; and means to apply correction factors so as to compensate for the errors due to dynamic flow in the calibration of flowmeters inserted in said first one of said conduits.

2. In a flow bench, means for providing flow rate indications free from dynamic error, comprising: means to provide a series of pre-selected nominal flow rates through said bench at differing dynamic levels; means responsive to said nominal flow rates for registering cumulatively said nominal flow rates; means for determining and registering the actual flow rates resulting from said nominal flow rates; means for comparing said nominal and actual flow rates to obtain the dynamic error values at different levels of flow; means for receiving and processing signals representing said dynamic error values at different levels of flow; and means responsive to said processed signals to determine the correct value of flow through equipment being calibrated.

3. In a flow bench adapted to calibrate flowmeters and the like, means for providing flow rate indications free from dynamic error, comprising: means adapted to provide a series of nominal flow rates at pre-selected rates, through said bench at differing dynamic levels; means responsive to said nominal flow rates for registering said nominal flow rates; means for determining and registering the actual flow rates resulting from said nominal flow rates; means responsive to the difference between said nominal flow rates and said actual flow rates at differing flow rate levels to obtain the dynamic error values of the flow bench at such differing flow rate levels; and means responsive to said values to obtain calibration readings for a flowmeter being calibrated which are free from dynamic error.

4. In a flow bench according to claim 1, wherein said means to determine the errors due to dynamic flow further comprises; flow straightening means in each of said conduits; means for pre-selecting a nominal rate of flow in each of said plurality of conduits; means for cumulatively measuring said nominal rates of flow over a period of time to secure the quantity of flow; means for measuring the actual total flow over said period of time, said pre-selecting means being adapted to provide other nominal rates of flow in each of said plurality of conduits.

5. In a flow bench adapted to calibrate flowmeters and the like, means for providing flow rate indications free from dynamic error, comprising: means to provide a series of pre-selected nominal flow rates through said bench at differing dynamic levels; means responsive to said flow rates for registering said nominal flow rates; means for determining and registering the actual flow rates resulting from said nominal flow rates; means responsive to the difference between said nominal flow rates and said actual flow rates at differing flow rate levels to obtain the dynamic error values of the flow bench at such differing flow rate levels; means adapted to store said dynamic error values of the flow bench at differing levels; means adapted to apply said stored dynamic error values to readings obtained in subsequent calibrating operations on said flow bench; and means adapted to apply said stored dynamic error values to subsequent calibrating operations to obtain calibrating readings free from dynamic errors in the flow bench.

6. In a flow bench, means for providing flow rate indications free from dynamic error, comprising: a plurality of branches adapted to have flow therethrough; means for controlling the rate of flow in each of said branches; means for measuring the instantaneous rates of flow in each of said branches at a plurality of flow rates and for cumulating said instantaneous rates to obtain a total flow input; means for measuring the actual quantity of material flowing through said bench in a defined period of time; means for comparing said measured actual quantity of flowing material with said measured total flow input; and means responsive to the difference between said actual and total quantities to provide an accurate indication of the total flow through said bench.

7. In a flow bench according to claim 1 and further comprising: data recording and processing means; means for supplying signals representing said pre-selected flow rates to said data recording means; means for supplying signals representing said registered actual flow rates to said data recording means; means for processing the said data supplied to said recording means representing pre-selected flow rates and actual flow rates to obtain an error function; means for storing said error function; and means adapted to respond to said stored error function to correct subsequent dynamic calibrating operations.

8. Means for determining the dynamic characteristics of a flow bench comprising; at least two flow paths and means for collecting the actual flow through said bench over a period of time, each of said flow paths having means for pre-selecting various nominal flow rates therethrough varying from zero to a maximum value, one of said branches being adapted to receive a flow measuring device for calibration, means for developing signals separately representing a plurality of pre-selected nominal flow rates through said flow bench; means for developing signals separately representing a plurality of actual flows over defined periods of time resulting from said pre-selected nominal flow rates through said bench; means for recording and storing said signals representative of the nominal and actual flow rates; responsive to said stored signals to produce an error function representing the differences over a plurality of flow rates between said pre-selected nominal flow rates and actual flow rates; means for storing said error function, and means adapted to respond to said stored error function to provide calibrations corrected for dynamic error.

9. Means for determining the dynamic characteristics of a flow bench said flow bench having at least two flow paths and means for collecting the actual flow through said bench over a period of time, each of said flow paths having means adapted to pre-select various nominal flow rates therethrough varying from zero to a maximum value, one of said branches being adapted to receive a flow measuring device for calibration, means adapted to develop, signals representing a plurality of pre-selected nominal flow rates through said flow bench, means adapted to develop signals separately representing a plurality of actual flows over periods of time resulting from said pre-selected nominal flow rates through said bench; means for recording and storing said signals representative of the nominal and actual flow rates; means responsive to said stored signals to produce an error function representing the differences over a plurality of flow rates between pre-selected nominal flow rates and actual flow rates; means adapted to store said error function, means for applying input signals from subsequent calibrations to correct said stored error function; and means responsive to said corrected stored error function to correct subsequent calibrations for dynamic error.

10. A method for determining and utilizing correctly the dynamic operating characteristics of a flow bench arrangement for calibrating flow meters and the like, said arrangement comprising: a plurality of branches, each having means for turning the flow off and on and for substantially predetermining rates of flow varying from zero to very large therethrough, independently of the others of said plurality of branches, which comprises: straightening the flow through each of said branches; substantially predetermining a series of flow rates through each of said plurality of branches individually; measuring for indication the quantity of material which has flowed through each of said branches during a measured time at each of said predetermined rates of flow; utilizing said quantities at said predetermined rates of flow as an indication of the inherent error in each of said branches as the flow rate therethrough approaches zero; combining said inherent errors as a measure of the over-all error in said system; and utilizing said combined errors to correct the flow quantity determined and indicated through the entire system.

11. A method for determining and utilizing the dynamic operating characteristics of a flow bench arrangement, having a plurality of branches for calibrating flow meters and the like, to improve the accuracy of flow bench readings, comprising the steps of adjusting said flow bench to provide a series of substantially predetermined flow rates at varying levels through each of said plurality of branches; registering the instantaneous rates of flow of each of said branches at each of said varying levels; cumulating said registered instantaneous rates to obtain a total registered input over a defined period of time; cumulating actual flow quantities during said defined period of time; comparing said cumulated registered instantaneous rates and said registered actual quantity of material passed through said branches in equal periods of time; and utilizing the results of said comparison to provide a corrected indication of the flow rates through said bench.

12. In a calibrating system, the method of operation which comprises the steps of setting up a first nominal flow through a first conduit; measuring a first actual flow rate resulting from said first nominal flow rate, setting up a plurality of additional nominal flow rates precisely related to said first nominal flow rate through said first conduit; measuring the actual flow quantities resulting from said additional flow rates through said first conduit; repeating said steps of setting up a plurality of different nominal flow rates and measuring the resulting actual flow from each; recording the results of said measurements and utilizing them to determine the indicated flow rate when the actual rate is reduced toward zero; and using said indicated flow rate when the actual flow rate is reduced toward zero to determine the absolute error under dynamic conditions.

No references cited.